Figure 1:
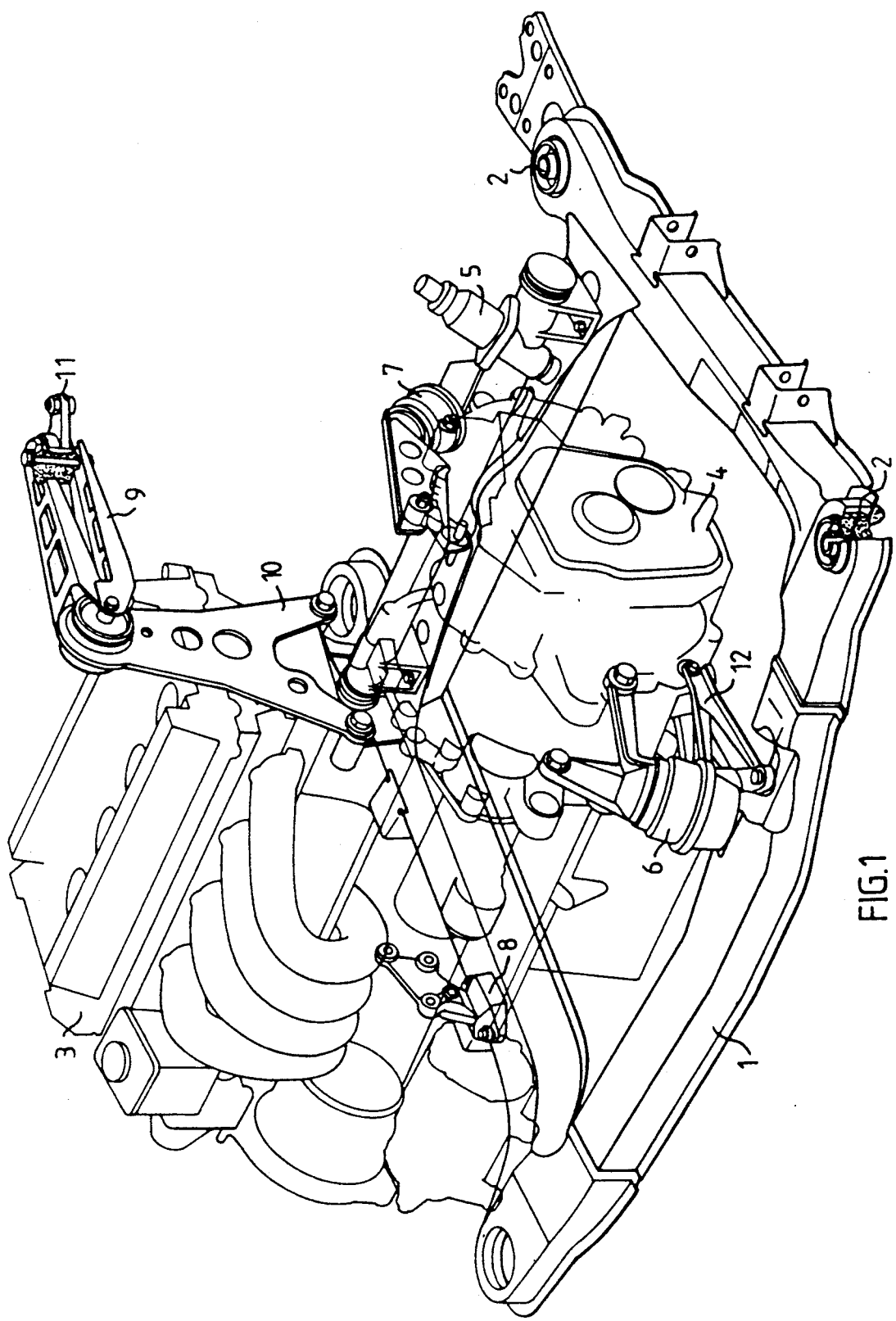

United States Patent [19]

Sjöstrand

[11] Patent Number: 5,035,296

[45] Date of Patent: Jul. 30, 1991

[54] VEHICLE ENGINE SUSPENSION DEVICE

[75] Inventor: Göran Sjöstrand, Gothenburg, Sweden

[73] Assignee: AB Volvo, Goteburg, Sweden

[21] Appl. No.: 476,387

[22] PCT Filed: Dec. 1, 1988

[86] PCT No.: PCT/SE88/00657
§ 371 Date: May 30, 1990
§ 102(e) Date: May 30, 1990

[87] PCT Pub. No.: WO89/05245
PCT Pub. Date: Jun. 15, 1989

[30] Foreign Application Priority Data

Dec. 3, 1987 [SE] Sweden ................. 8704847

[51] Int. Cl.$^5$ ............................. F16F 15/08
[52] U.S. Cl. .................... 180/297; 180/292; 180/312
[58] Field of Search ........... 180/312, 297, 299, 300, 180/292, 291; 248/647, 605; 267/219

[56] References Cited

U.S. PATENT DOCUMENTS 3,132,830  5/1964  Adloff ......................... 180/312
4,240,517 12/1980  Harlow et al. ................. 180/295

FOREIGN PATENT DOCUMENTS 141137    1/1980  Denmark.
3222204  12/1983  Fed. Rep. of Germany.
58-221039 12/1983  Japan.

Primary Examiner—David M. Mitchell
Attorney, Agent, or Firm—Young & Thompson

[57] ABSTRACT

A vehicle engine suspension arrangement includes at least one pair of compressible engine cushions (6, 7) which are connected to the engine (3) and which are provided with supports (17) for attachment against seats (20) located on an engine bed (1). The cushions and seats have axes of symmetry that are inclined upward toward one another. The distance (a) between the axes of symmetry of the supports (17) in the unloaded expanded condition of the cushions (6, 7) is greater than the distance (b) between the axes of symmetry of the seats (20). The compressibility of the cushions (6, 7) is adapted to the weight of the engine so that, when the cushions are subjected to the static weight of the engine, those axes of symmetry coincide and the cushions are essentially free from shear forces. The supports and seats have interengaging conical surfaces, and the supports have the form of inverted truncated cones and the seats are conical recesses. The cone angle of the seats is slightly more acute than the cone angle of the supports.

4 Claims, 2 Drawing Sheets

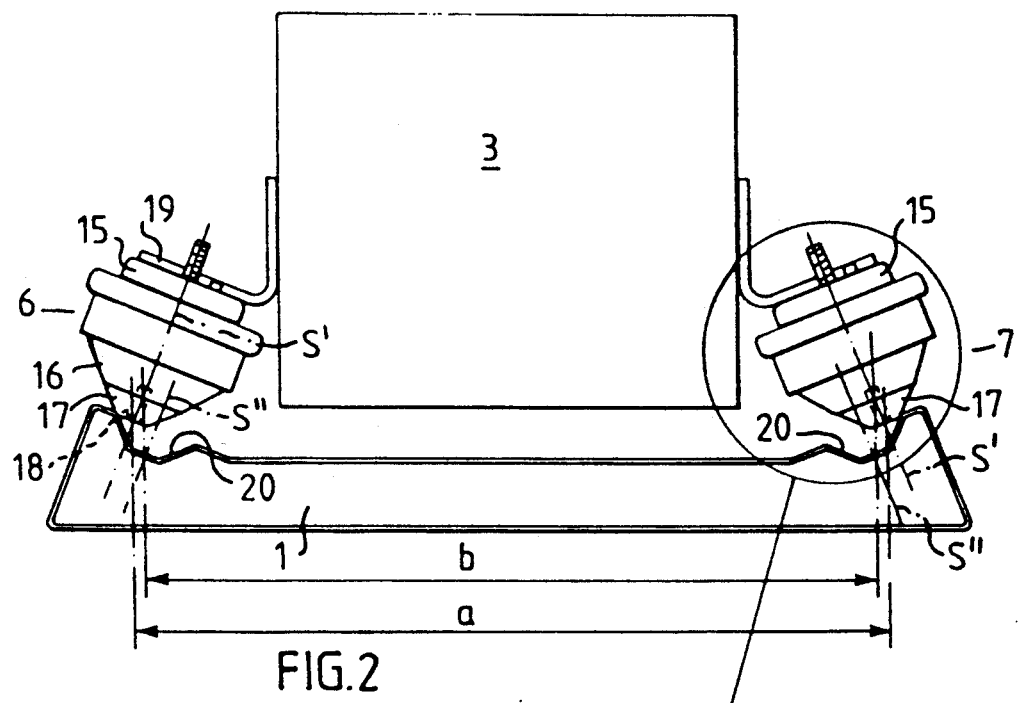
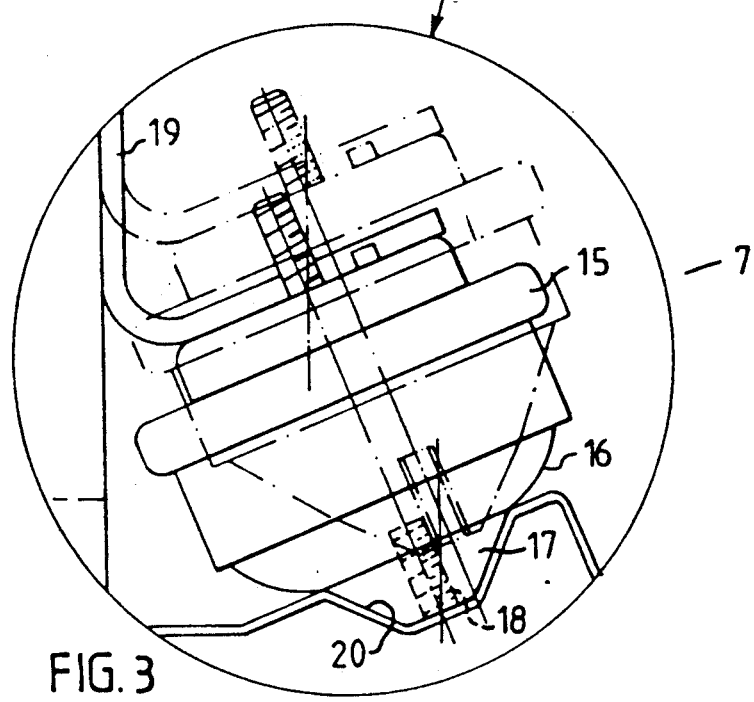

VEHICLE ENGINE SUSPENSION DEVICE

The present invention relates to a vehicle engine suspension device which comprises at least one pair of compressible engine cushions or pads connected to the engine and having supports intended for attachment to the seats of an engine bed plate, wherein the cushions are inclined towards one another in the direction of compression and the seats are inclined correspondingly.

It is conventional to position the engine cushions of each engine cushion pair located on respective opposite sides of a vehicle engine—as seen in its axial direction—such that said cushions are inclined towards one another in the direction of compression and therewith cause the natural frequencies of the engine to lie within a narrower frequency band. In the case of known installations of this kind, the distance between the cushion supports in the absence of compressive load is equal to the distance between the seats on the chassis frame in the engine compartment. When the engine is lowered into the engine compartment and the supports come into contact with the seats, the cushions are subjected to shear forces as a result of the weight exerted thereon by the engine. Engine cushions, however, and particularly liquid-damped cushions, are primarily constructed to take up solely compression forces and their useful life will be shortened considerably if the cushions are subjected to excessive shear forces.

The object of the present invention is to provide a vehicle engine suspension system of the kind described in the introduction in which the engine cushions will be subjected solely to compression forces in the direction of symmetry.

This object is achieved in accordance with the invention in that the distance between the supports in the unloaded expanded condition of the cushions is greater than the distance between the seats and that the compressibility of the cushions is adapted to the weight of the engine so that, when the cushions are subject to the static weight of the engine, the distance between the supports is equal to the distance between the seats so as to ensure that the cushions are essentially free from shear forces when compressed by the engine.

Since the cushions are inclined towards one another, the lower ends of the cushions will move progressively closer together as the cushions are compressed.

By suitably adapting this mutual spacing in the absence of load to the degree of compressibility attainable and to the dead weight of the engine, it can be ensured that the compression resulting from the engine weight will be precisely that required to decrease the distance between the supports to an extent such that said distance will be equal to the distance between the seats when the cushions are subjected to the static weight of the engine. By "engine weight" is meant here and in the following that part of the weight of the entire engine assembly, i.e. engine, clutch and gear box, which is to be supported by the cushions.

The invention will now be described in more detail with reference to exemplifying embodiments thereof illustrated in the accompanying drawings, in which FIG. 1 is a perspective view of a complete engine suspension system intended for a transversely positioned engine, FIG. 2 is a side view of engine cushions and mounting, with the engine illustrated schematically, and FIG. 3 is an enlarged view of the circled area in FIG. 2.

The engine suspension illustrated in FIG. 1 includes an intermediate frame 1 which is intended to be mounted on the vehicle chassis with the aid of resilient vibration-damping bushes 2, one at each corner of the frame. The frame 1 carries the engine 3 together with the gear box 4 and the vehicle steering transmission 5.

A pair of dampened engine cushions 6, 7 are mounted between the engine 3 and the frame 1, in front of and behind said engine respectively as seen in the direction of the vehicle long axis. The main function of the cushions is to dampen vertically acting engine movement and vibrations and will suitably be of the liquid-damped kind. The cushions are placed on respective sides of a plane extending vertically through the common centre of gravity of the engine and gear box. A third cushion 8 is mounted between the forwardly located edge surface of the engine and the right-hand side of the frame, the purpose of this third cushion being to impart a suitable natural frequency to the engine in the vehicle roll direction. This third cushion 8 may also be a liquid-damped cushion. Although not necessarily so. A torque brace 9 is mounted resiliently on the left-hand side of the engine block, above the gear box 4, one end of the brace being mounted on a torque arm 10 on the engine block and the other end thereof being mounted on a bracket 11 on the rear defining wall (not shown) of the engine compartment. A further torque brace 12 connects the engine with the intermediate frame 1. The main purpose of the braces is to counteract twisting of the engine when the vehicle is accelerated or braked.

The cushions 6, 7 also counteract tendencies of the engine to twist or likewise rotate. The cushions 6, 7 are best seen from FIGS. 2 and 3 and comprise a cylindrical, metal holder part 15, a resilient body 16 attached to the holder part and a metal, conical support element 17 which is attached to the resilient body 16 and has located therein a central, screwthreaded bore 18. Each of the holder parts 15 of the cushions 6,7 is screwed firmly to its respective attachment 19 on the engine. The attachments 19 each have a length dimension which is so adapted that a distance $a$ between the cushion symmetry axes S' in the non-loaded state of said cushions is greater than a distance $b$ between the symmetry axes S" of a pair of seats 20 on the frame 1. The differences are exaggerated in FIG. 2, for the sake of illustration. The seats 20 have the form of a pair of conical recesses which are complementary with the conical support elements 17 of the cushions.

FIG. 2 illustrates the stage of an engine mounting process in which the outer side surfaces of the supports and the seats 20 are in contact with one another. As the engine is lowered, the resilient bodies 16 of the cushions 6, 7 are progressively further compressed until finally, when the whole weight of the engine rests on all three cushions 6, 7 and 8. They are compressed to an extent such that the symmetry axes S' and S" of the supports 17 and the seats 20 coincide, as illustrated in FIG. 3. Thus as a result of this compression, the original distance $a$ between the supports 17 is reduced to a distance $b$, i.e. a distance which is equal to the distance between the seats 20.

The conicity of the cushion supports 17 and the seats 20 is effective in guiding the engine automatically into its correct position on the engine bed. When the engine is in place and the cushions 6, 7 compressed, as shown in FIG. 3., a bolt (not shown) is screwed through the bottom of a respective seat and into a bore 18 in respective support elements 17. Although FIGS. 2 and 3 show the seats 20 and the supports 17 to have mutually the same conicity, the seats will preferably be slightly more pointed than the supports, so as to ensure a clearance-free, or fully tight, connection when the securing bolts are tightened.

The distance $a$ between the cushions 6, 7 is thus chosen with respect to the resistance of the cushions to compression and to that part of the engine weight which the cushions are intended to support such that the compression caused by the static load of the engine —in practice in the order of magnitude of 10 mm —will result in a reduction in said distance $a$ to the distance $b$, and therewith ensuring that the resilient bodies of the cushions will not be subjected to shear forces.

I claim:

1. In a vehicle engine suspension arrangement comprising at least one pair of compressible engine cushions (6, 7) which are connected to the engine (3) and which include supports (17) for attachment against seats (20) located on an engine bed (1), the cushions and seats having axes of symmetry that are inclined upward and inward toward one another; each cushion being compressible in the direction of its axis of symmetry; the improvement wherein the distance (a) between the axes of symmetry at the supports (17) in the unloaded expanded condition of the cushions (6, 7) is greater than the distance (b) between the axes of symmetry at the seats (20), the compressibility of the cushions (6, 7) being adapted to the weight of the engine so that, when the cushions are subjected to the static weight of the engine, said axes of symmetry coincide and the cushions are essentially free from shear forces.

2. An arrangement as claimed in claim 1, wherein said supports and seats have interengaging conical surfaces.

3. An arrangement as claimed in claim 1, in which said supports have the form of inverted truncated cones and said seats are conical recesses.

4. An arrangement as claimed in claim 2, in which the cone angle of the seats is slightly more acute than the cone angle of the supports.

* * * * *